US011327620B1

(12) United States Patent
Ye et al.

(10) Patent No.: US 11,327,620 B1
(45) Date of Patent: May 10, 2022

(54) TOUCH SENSING LAYER AND TOUCH PANEL

(71) Applicant: TPK Advanced Solutions Inc., Fujian (CN)

(72) Inventors: Caijin Ye, Xiamen (CN); Chun Yan Wu, Xiamen (CN); Tsai-Kuei Wei, Hsinchu County (TW); Chen-Hsin Chang, Taoyuan (TW); Lien-Hsin Lee, Taipei (TW); Tai-Shih Cheng, Taipei (TW)

(73) Assignee: TPK Advanced Solutions Inc., Xiamen (CN)

( * ) Notice: Subject to any disclaimer, the term of this patent is extended or adjusted under 35 U.S.C. 154(b) by 0 days.

(21) Appl. No.: 17/091,279

(22) Filed: Nov. 6, 2020

(51) Int. Cl.
*G06F 3/044* (2006.01)

(52) U.S. Cl.
CPC .......... *G06F 3/0446* (2019.05); *G06F 3/0443* (2019.05); *G06F 2203/04111* (2013.01)

(58) Field of Classification Search
CPC .......... G06F 3/0446; G06F 3/0443; G06F 2203/04111
See application file for complete search history.

(56) References Cited

U.S. PATENT DOCUMENTS

| 8,400,418 | B2* | 3/2013 | Matsuo | G06F 3/0443 345/174 |
| 9,634,660 | B2* | 4/2017 | Trend | H03K 17/9622 |
| 10,042,493 | B2* | 8/2018 | Sato | G06F 3/0446 |
| 11,023,083 | B2* | 6/2021 | Jo | G06F 3/046 |
| 2016/0139728 | A1* | 5/2016 | Jeon | G06F 3/0448 345/173 |
| 2016/0209952 | A1* | 7/2016 | Lin | G06F 3/0443 |
| 2017/0147126 | A1* | 5/2017 | Chiu | G06F 3/0443 |
| 2017/0262108 | A1* | 9/2017 | Lin | G02F 1/134309 |
| 2017/0344162 | A1* | 11/2017 | Lee | G06F 3/0412 |
| 2018/0335919 | A1* | 11/2018 | Xu | G06F 3/0448 |
| 2019/0018518 | A1* | 1/2019 | Choi | G06F 3/0446 |
| 2019/0050076 | A1* | 2/2019 | Zhang | G06F 3/0443 |
| 2019/0056821 | A1* | 2/2019 | Choi | G06F 3/0443 |
| 2019/0064964 | A1* | 2/2019 | Choi | G06F 3/0443 |
| 2019/0079622 | A1* | 3/2019 | Choi | G06F 3/0446 |
| 2019/0369787 | A1* | 12/2019 | Park | G06F 3/044 |
| 2020/0033967 | A1* | 1/2020 | Yang | G06F 3/044 |
| 2020/0183518 | A1* | 6/2020 | Na | G06F 3/0448 |
| 2020/0363909 | A1* | 11/2020 | Takahashi | H01B 5/14 |
| 2020/0371644 | A1* | 11/2020 | Choi | G06F 3/0448 |
| 2021/0141477 | A1* | 5/2021 | Yang | G06F 3/0445 |
| 2021/0325999 | A1* | 10/2021 | Liu | G06F 3/0412 |

FOREIGN PATENT DOCUMENTS

TW 201923532 A 6/2019

* cited by examiner

*Primary Examiner* — Amy Onyekaba
(74) *Attorney, Agent, or Firm* — Cooper Legal Group, LLC (57) ABSTRACT

A touch sensing layer includes a first-axis conductive unit, a second-axis conductive unit, and at least one dummy electrode. The first-axis conductive unit substantially extends along a first axial direction. The second-axis conductive unit substantially extends along a second axial direction and includes two conductive electrodes and a conductive bridge. The two conductive electrodes are respectively located at opposite sides of the first-axis conductive unit. The conductive bridge crosses the first-axis conductive unit and is connected to the two conductive electrodes. The dummy electrode includes at least one part located in a gap formed between the first-axis conductive unit and one of the two conductive electrodes.

20 Claims, 7 Drawing Sheets

TOUCH SENSING LAYER AND TOUCH PANEL

BACKGROUND

Technical Field

The present disclosure relates to a touch sensing layer and a touch panel.

Description of Related Art

With the trends of ever-increasing size and being indispensable in gaming applications, the most critical change in touch display devices is the continuous improvement of the display refresh rate of the display module. For example, the display refresh rate of the display module of a mobile phone will be increased from 120 Hz to 180 Hz, or even to 240 Hz. Correspondingly, the touch refresh rate of the touch module is also required to increase simultaneously.

As far as the principle of touch refresh rate is concerned, the driving speed of a touch module is mainly based on the mutual capacitance (Cm) value between the driving electrode (Tx) and the receiving electrode (Rx). Specifically, the speed of driving each electrode scan is determined by the charging and discharging speed, which depends on the resistance-capacitance (RC) value for the touch module. The smaller the RC value, the faster the charging and discharging speed (that is, the higher the touch refresh rate); the larger the RC value, the slower the charging and discharging speed (that is, the lower the touch refresh rate). Taking the conventional architecture using Tx and Rx that are interleaving with the bridging design, two adjacent Tx and Rx are extremely close and have a large Cm value, so the touch refresh rate is low and cannot be effectively improved.

Accordingly, how to provide a touch sensing layer and a touch panel to solve the aforementioned problems becomes an important issue to be solved by those in the industry.

SUMMARY

An aspect of the disclosure is to provide a touch sensing layer and a touch panel that can efficiently solve the aforementioned problems.

According to an embodiment of the disclosure, a touch sensing layer includes a first-axis conductive unit, a second-axis conductive unit, and at least one dummy electrode. The first-axis conductive unit substantially extends along a first axial direction. The second-axis conductive unit substantially extends along a second axial direction and includes two conductive electrodes and a conductive bridge. The two conductive electrodes are respectively located at opposite sides of the first-axis conductive unit. The conductive bridge crosses the first-axis conductive unit and is connected to the two conductive electrodes. The dummy electrode includes at least one part located in a gap formed between the first-axis conductive unit and one of the two conductive electrodes.

In an embodiment of the disclosure, the at least one dummy electrode includes a main body portion and an extending portion. The main body portion is arranged with the first-axis conductive unit in the second axial direction and arranged with the one of the two conductive electrodes in the first axial direction. The extending portion is connected to the main body portion and extends into the gap.

In an embodiment of the disclosure, the extending portion is strip-shaped.

In an embodiment of the disclosure, an end of the extending portion away from the main body portion has an end surface.

In an embodiment of the disclosure, the at least one dummy electrode includes two main body portions and an extending portion. The main body portions are respectively located at opposite sides of one of the two conductive electrodes. The extending portion is connected to the two main body portions and extends into the gap.

In an embodiment of the disclosure, the extending portion is arranged between the two conductive electrodes in the second axial direction.

In an embodiment of the disclosure, the at least one dummy electrode is arranged between the two conductive electrodes in the second axial direction.

In an embodiment of the disclosure, a number of the at least one dummy electrode is plural. The dummy electrodes are arranged along the gap.

In an embodiment of the disclosure, a number of the at least one dummy electrode is plural. The dummy electrodes are arranged from a boundary of the gap to another boundary of the gap.

According to an embodiment of the disclosure, a touch panel includes a substrate and the touch sensing layer. The touch sensing layer is disposed on the substrate.

Accordingly, in the touch sensing layer of the present disclosure, the dummy electrode is arranged between the first-axis conductive unit and the second-axis conductive unit, and at least a part of the dummy electrode is located in the gap formed between the first-axis conductive unit and the second-axis conductive unit. In this way, the mutual capacitance (Cm) value between the first-axis conductive unit and the second-axis conductive unit can be effectively reduced, and the resistance-capacitance (RC) value can be reduced, thereby effectively improving the touch refresh rate of the touch panel.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever pos- 142b. The first insulating layer 143 is disposed between the first-axis conductive units 141 and the conductive bridges 142b, so as to electrically insulate the first-axis conductive units 141 from the second-axis conductive units 142.

Figure 1:
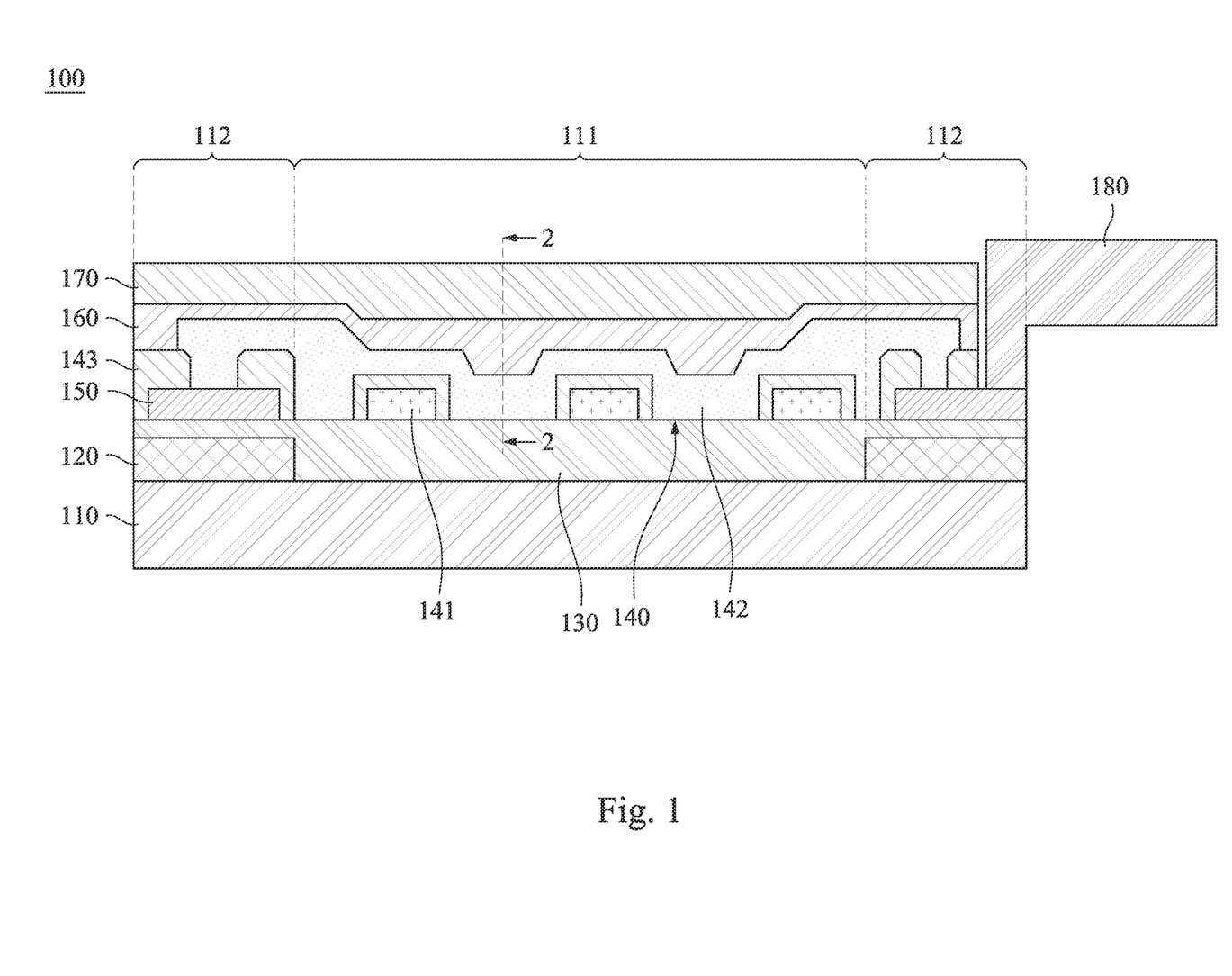
FIG. 1 is a cross-sectional view of a touch panel according to an embodiment of the disclosure.
Figure 2:
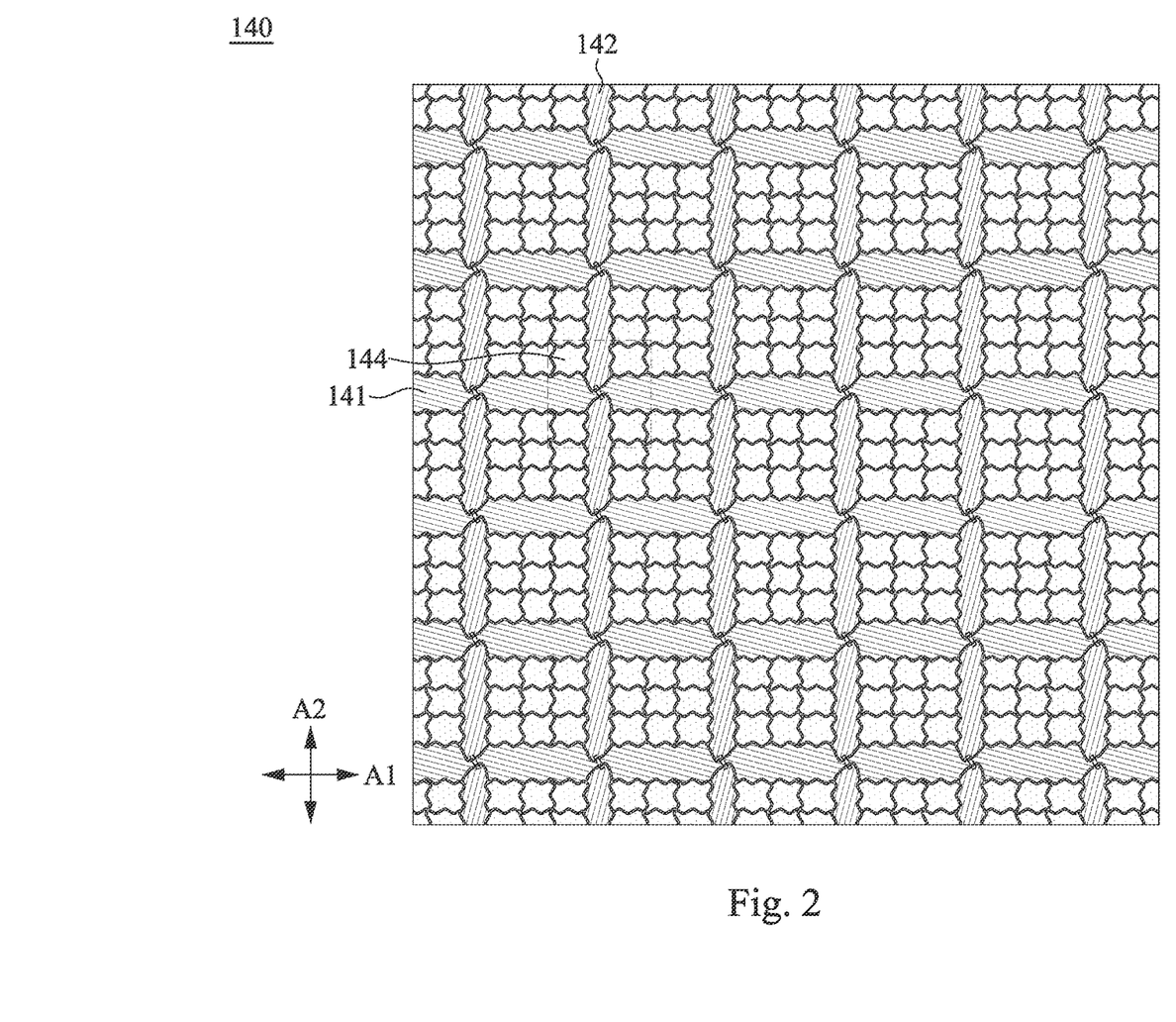
FIG. 2 is a partial front view of a touch sensing layer according to an embodiment of the disclosure.

As shown in FIG. 1, the touch panel 100 further includes a second insulating layer 160 (which has the effect of a second optical matching layer, as further described below), a protective layer 170, and a flexible circuit board 180. The second insulating layer 160 covers the second-axis conductive units 142. The protective layer 170 covers the second insulating layer 160. The flexible circuit board 180 is connected to the traces 150 located in the peripheral area 112 and extracts touch signals of the touch sensing layer 140 through the traces 150.

In some embodiments, a material of the substrate 110 includes glass, but the disclosure is not limited in this regard.

Figure 3:
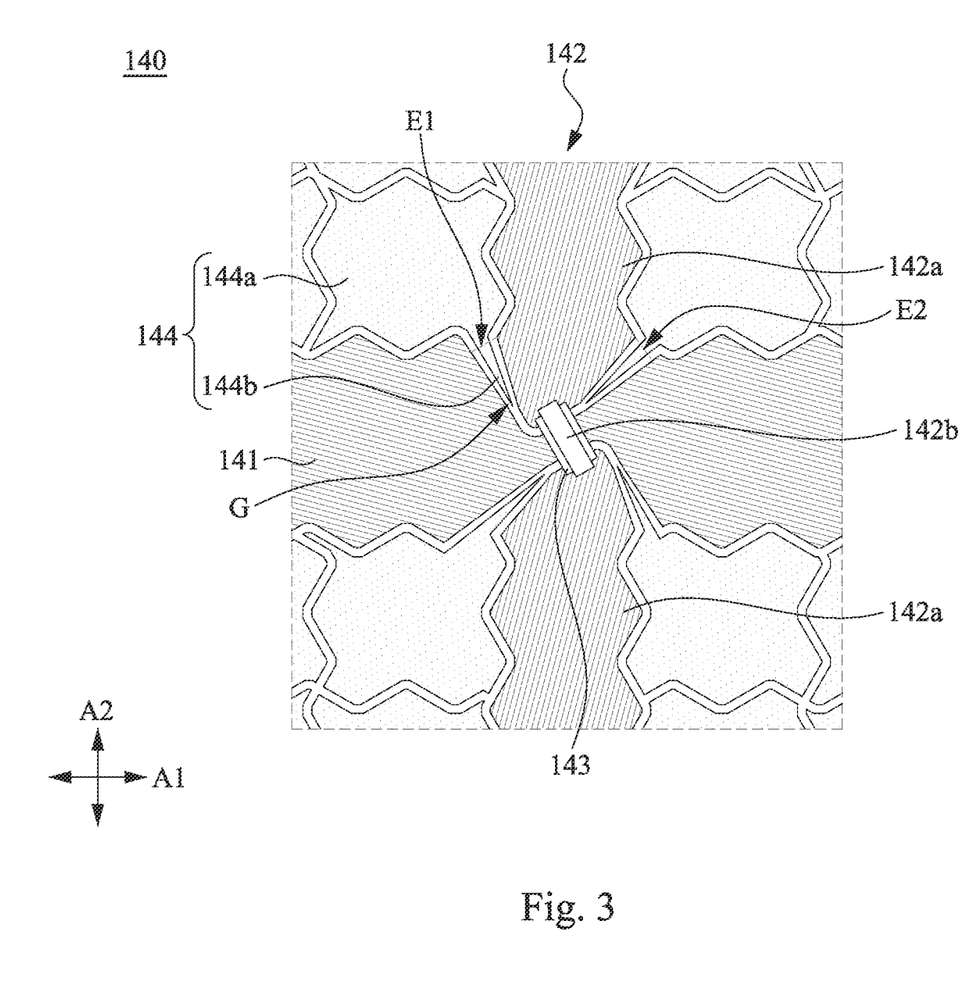
FIG. 3 is a partially enlarged front view of a touch sensing layer according to an embodiment of the disclosure.

Reference is made to FIG. 3. FIG. 3 is a partially enlarged front view of a touch sensing layer 140 according to an embodiment of the disclosure. FIG. 3 shows one first-axis conductive unit 141, two conductive electrodes 142a and one conductive bridge 142b of one second-axis conductive unit 142, and a plurality of dummy electrodes 144. The two conductive electrodes 142a are respectively located at opposite sides of the first-axis conductive unit 141. The conductive bridge 142b crosses the first-axis conductive unit 141 and is connected to the two conductive electrodes 142a. The dummy electrode 144 includes at least one part located in a gap G formed between the first-axis conductive unit 141 and one of the two conductive electrodes 142a. In some embodiments, the gap G formed between the first-axis conductive unit 141 and one of the two conductive electrodes 142a can be defined as a narrow channel formed by an end of the conductive electrode 142a close to the first-axis conductive unit 141 and the first-axis conductive unit 141, and the narrow channel is communicated with (i.e., extends between) opposite sides of the conductive electrode 142a.

Specifically, as shown in FIG. 3, the gap G formed between the first-axis conductive unit 141 and one of the two conductive electrodes 142a has two ends E1, E2 (indicated by dotted lines in the figure), and the two ends E1, E2 are located where the distance between the first-axis conductive unit 141 and the conductive electrode 142a begins to decrease suddenly, so that the gap G between the two ends E1, E2 has the shape of the aforementioned narrow channel.

In the present embodiment, the dummy electrode 144 includes a main body portion 144a and an extending portion 144b. The main body portion 144a is located outside the gap G, arranged with the first-axis conductive unit 141 in the second axial direction A2 (i.e., the main body portion 144a is arranged adjacent to the first-axis conductive unit 141 in the second axial direction A2), and arranged with the conductive electrode 142a in the first axial direction A1 (i.e., the main body portion 144a is arranged adjacent to the conductive electrode 142a in the first axial direction A1). The extending portion 144b is connected to the main body portion 144a and extends into the gap G. In detail, the extending portion 144b is arranged between the two conductive electrodes 142a in the second axial direction A2. Appearance-wise, the main body portion 144a can be regarded as an island structure spaced apart from the first-axis conductive unit 141 and the second-axis conductive unit 142, and the extending portion 144b can be regarded as a peninsula structure extending from the main body portion 144a.

With the foregoing structural configurations, the extending portion 144b of the dummy electrode 144 located in the gap G can effectively reduce the mutual capacitance (Cm)

value between the first-axis conductive unit 141 and the second-axis conductive unit 142, so as to reduce the resistance-capacitance (RC) value (influencing the touch refresh rate) and thus effectively improve the touch refresh rate of the touch panel 100. In addition, the provision of the dummy electrode 144 between the first-axis conductive unit 141 and the second-axis conductive unit 142 can also effectively improve the visual effect of the touch panel 100 (for example, removing marks of etching lines).

In practical applications, the aforementioned shape and structure of the dummy electrode 144 can be applied to all dummy electrodes 144 respectively adjacent to the intersections between the first-axis conductive units 141 and the second-axis conductive units 142.

In some embodiments, as shown in FIG. 3, the extending portion 144b has a sharp corner at one end away from the main body portion 144a, but the disclosure is not limited in this regard.

Figure 4:
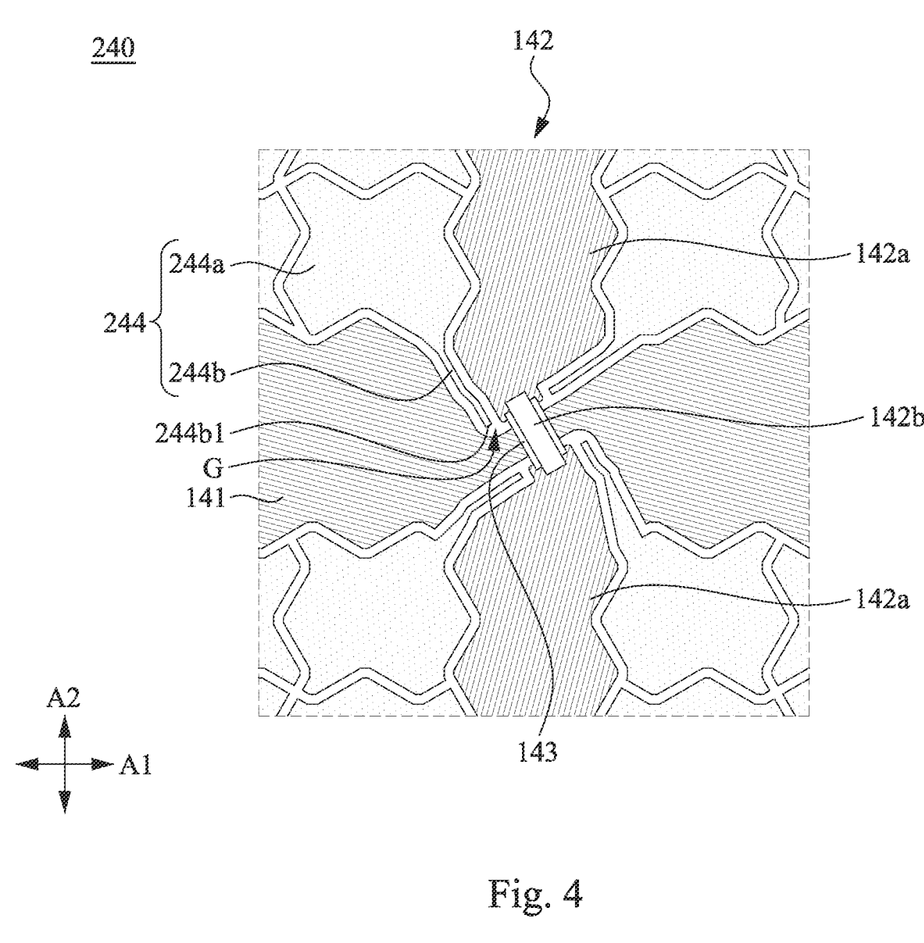
FIG. 4 is a partially enlarged front view of a touch sensing layer according to another embodiment of the disclosure.

Reference is made to FIG. 4. FIG. 4 is a partially enlarged front view of a touch sensing layer 240 according to another embodiment of the disclosure. FIG. 4 shows one first-axis conductive unit 141, two conductive electrodes 142a and one conductive bridge 142b of one second-axis conductive unit 142, and a plurality of dummy electrodes 244, in which the first-axis conductive unit 141 and the second-axis conductive unit 142 are identical or similar to those of the embodiment shown in FIG. 3, and therefore reference may be made to the aforementioned related descriptions and will not be repeated here. In addition, the dummy electrode 244 includes a main body portion 244a and an extending portion 244b. The main body portion 244a is located outside the gap G, arranged with the first-axis conductive unit 141 in the second axial direction A2 (i.e., the main body portion 244a is arranged adjacent to the first-axis conductive unit 141 in the second axial direction A2), and arranged with one of the conductive electrode 142a in the first axial direction A1 (i.e., the main body portion 244a is arranged adjacent to the conductive electrode 142a in the first axial direction A1).

It should be noted that, compared with the embodiment shown in FIG. 3, the appearance of the dummy electrode 244 in the present embodiment is modified. Specifically, an end of the extending portion 244b away from the main body portion 244a has an end surface 244b1. In other words, the end of the extending portion 244b away from the main body portion 244a has a certain width, and the extending portion 244b is strip-shaped. Hence, the extending portion 244b can extend deeper in the gap G, so as to further reduce the Cm value between the first-axis conductive unit 141 and the second-axis conductive unit 142 and thus reduce the RC value.

Figure 5:
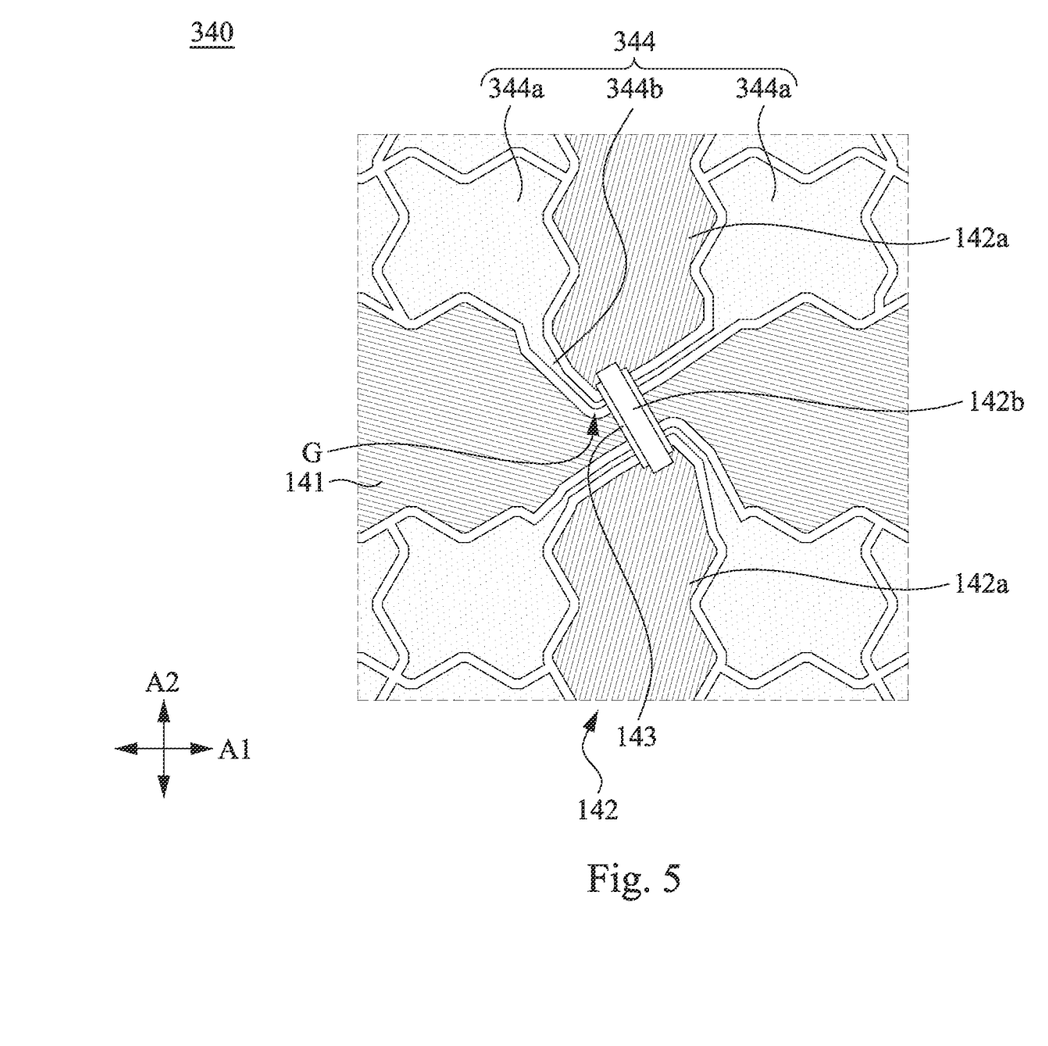
FIG. 5 is a partially enlarged front view of a touch sensing layer according to another embodiment of the disclosure.

Reference is made to FIG. 5. FIG. 5 is a partially enlarged front view of a touch sensing layer 340 according to another embodiment of the disclosure. FIG. 5 shows one first-axis conductive unit 141, two conductive electrodes 142a and one conductive bridge 142b of one second-axis conductive unit 142, and a plurality of dummy electrodes 344, in which the first-axis conductive unit 141 and the second-axis conductive unit 142 are identical or similar to those of the embodiment shown in FIG. 3, and therefore reference may be made to the aforementioned related descriptions and will not be repeated here. It should be noted that, compared with the embodiment shown in FIG. 3, the appearance of the dummy electrode 344 in the present embodiment is modified.

Specifically, in the present embodiment, the dummy electrode 344 includes two main body portions 344a and an extending portion 344b. The two main body portions 344a are respectively located at opposite sides of one of the two conductive electrodes 142a. The extending portion 344b is connected to the main body portions 344a and extends into the gap G. Hence, the first-axis conductive unit 141 and the conductive electrode 142a are completely separated to be respectively located at opposite sides of the extending portion 344b, so as to further reduce the Cm value between the first-axis conductive unit 141 and the second-axis conductive unit 142 and thus reduce the RC value.

Figure 6:
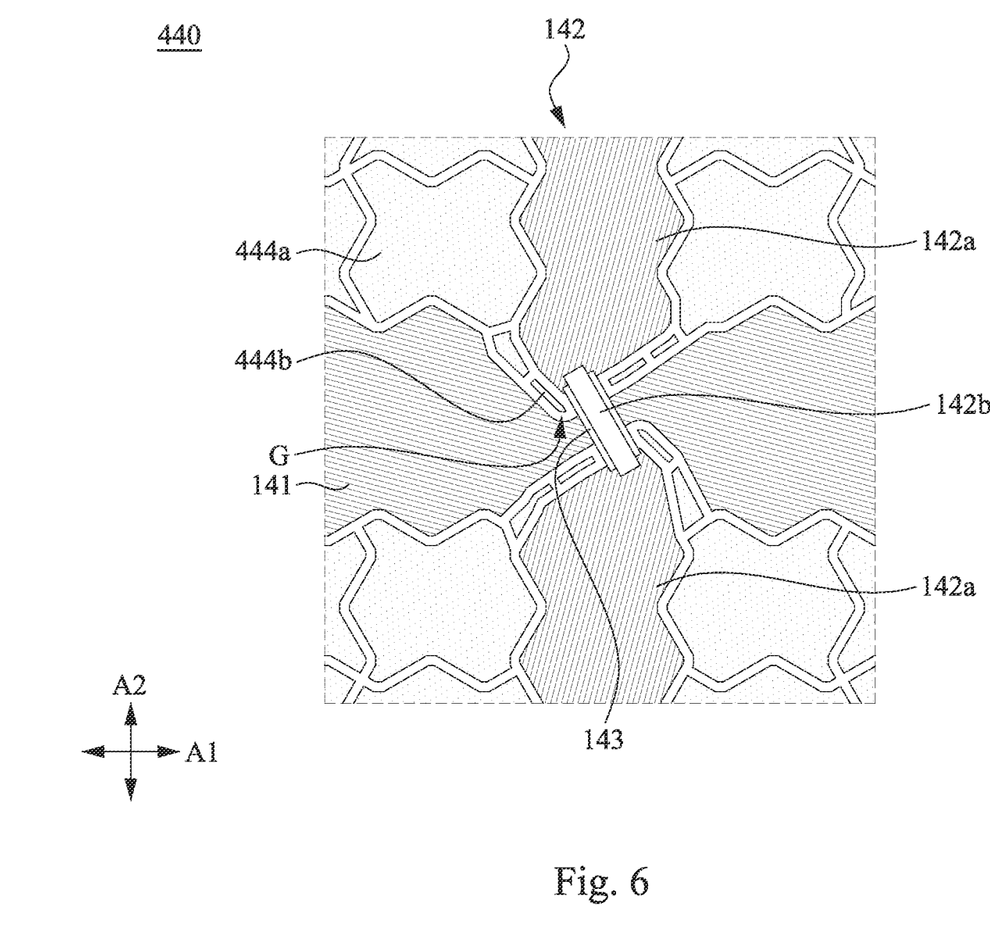
FIG. 6 is a partially enlarged front view of a touch sensing layer according to another embodiment of the disclosure.

Reference is made to FIG. 6. FIG. 6 is a partially enlarged front view of a touch sensing layer 440 according to another embodiment of the disclosure. FIG. 6 shows one first-axis conductive unit 141, two conductive electrodes 142a and one conductive bridge 142b of one second-axis conductive unit 142, and a plurality of dummy electrodes 444a, 444b, in which the first-axis conductive unit 141 and the second-axis conductive unit 142 are identical or similar to those of the embodiment shown in FIG. 3, and therefore reference may be made to the aforementioned related descriptions and will not be repeated here. It should be noted that, compared with the embodiment shown in FIG. 3, the appearance of the dummy electrodes 444a, 444b in the present embodiment is modified.

Specifically, in the present embodiment, the dummy electrodes 444a are located outside the gap G, and the dummy electrodes 444b are located in the gap G. Furthermore, the dummy electrodes 444b located in the gap G are arranged between the two conductive electrodes 142a in the second axial direction A2 and are arranged along the gap G. Appearance-wise, the dummy electrodes 444a located outside the gap G can be regarded as island structures separated from the first-axis conductive unit 141 and the second-axis conductive unit 142, and the dummy electrodes 444b located in the gap G can be regarded as isolated island structures.

Figure 7:
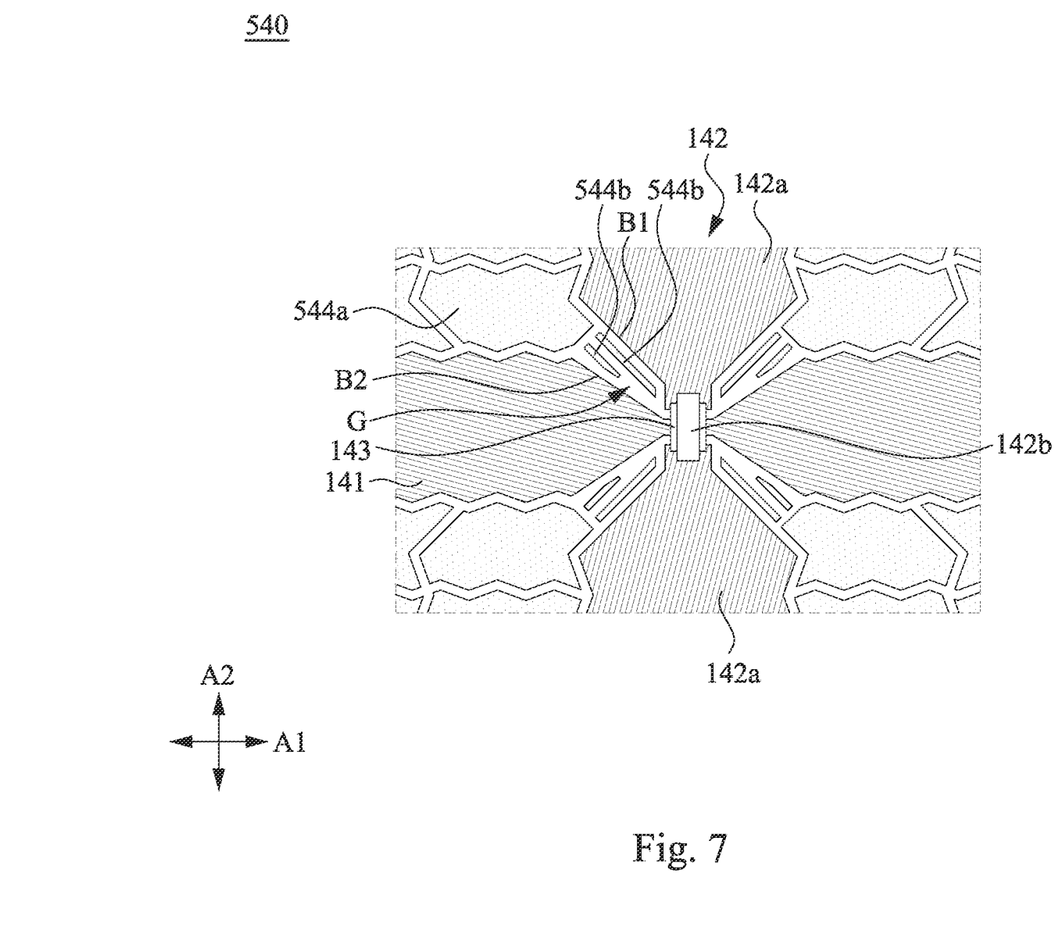
FIG. 7 is a partially enlarged front view of a touch sensing layer according to another embodiment of the disclosure.

Reference is made to FIG. 7. FIG. 7 is a partially enlarged front view of a touch sensing layer 540 according to another embodiment of the disclosure. FIG. 7 shows one first-axis conductive unit 141, two conductive electrodes 142a and one conductive bridge 142b of one second-axis conductive unit 142, and a plurality of dummy electrodes 544a, 544b, in which the first-axis conductive unit 141 and the second-axis conductive unit 142 are identical or similar to those of the embodiment shown in FIG. 3, and therefore reference may be made to the aforementioned related descriptions and will not be repeated here. It should be noted that, compared with the embodiment shown in FIG. 3, the appearance of the dummy electrode 544a, 544b in the present embodiment is modified.

Specifically, in the present embodiment, the dummy electrodes 544a are located outside the gap G, and the dummy electrodes 544b are located in the gap G. Furthermore, the dummy electrodes 544b located in the gap G are arranged from a boundary B1 of the gap G to another boundary B2 of the gap G. In other words, the first-axis conductive unit 141 and the conductive electrode 142a are separated by the two dummy electrodes 544b in the gap G. Hence, the Cm value between the first-axis conductive unit 141 and the second-axis conductive unit 142 can be further reduced, so as to reduce the RC value.

According to the foregoing recitations of the embodiments of the disclosure, it can be seen that in the touch sensing layer of the present disclosure, the dummy electrode is arranged between the first-axis conductive unit and the second-axis conductive unit, and at least a part of the dummy electrode is located in the gap formed between the first-axis conductive unit and the second-axis conductive unit. In this way, the mutual capacitance (Cm) value between the first-axis conductive unit and the second-axis conductive unit can be effectively reduced, and the RC value can be reduced, thereby effectively improving the touch refresh rate of the touch panel.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A touch sensing layer, comprising:
   a first-axis conductive unit substantially extending along a first axial direction;
   a first second-axis conductive unit and a second second-axis conductive unit substantially extending along a second axial direction, the first second-axis conductive unit comprising:
      two conductive electrodes respectively located at opposite sides of the first-axis conductive unit; and
      a conductive bridge crossing the first-axis conductive unit and connected to the two conductive electrodes; and
   at least one dummy electrode comprising at least one part located in a gap formed between the first-axis conductive unit and one of the two conductive electrodes, wherein:
      the at least one dummy electrode comprises:
         a first main body portion arranged with the first-axis conductive unit in the second axial direction and arranged with the one of the two conductive electrodes in the first axial direction; and
         an extending portion in direct contact with the first main body portion and extending into the gap, and
      the at least one dummy electrode comprises a plurality dummy electrodes disposed between the first second-axis conductive unit and the second second-axis conductive unit.

2. The touch sensing layer of claim 1, wherein the extending portion is strip-shaped.

3. The touch sensing layer of claim 1, wherein an end of the extending portion away from the first main body portion has an end surface.

4. The touch sensing layer of claim 1, wherein the extending portion is arranged between the two conductive electrodes in the second axial direction.

5. The touch sensing layer of claim 1, wherein the at least one dummy electrode comprises:
   a second main body portion, wherein:
      the first main body portion and the second main body portion are respectively located at opposite sides of the one of the two conductive electrodes, and
      the extending portion is connected to the first main body portion and the second main body portion and extends into the gap.

6. The touch sensing layer of claim 5, wherein the extending portion is arranged between the two conductive electrodes in the second axial direction.

7. The touch sensing layer of claim 1, wherein the at least one dummy electrode is arranged between the two conductive electrodes in the second axial direction.

8. A touch panel, comprising:
   a substrate; and
   the touch sensing layer of claim 1 disposed on the substrate.

9. The touch sensing layer of claim 1, wherein the extending portion underlies the conductive bridge.

10. The touch sensing layer of claim 1, wherein the extending portion is between the first-axis conductive unit and the one of the two conductive electrodes in the first axial direction.

11. The touch sensing layer of claim 1, wherein the extending portion is between the first-axis conductive unit and the one of the two conductive electrodes in the first axial direction and the second axial direction.

12. A touch sensing layer, comprising:
   a first-axis conductive unit substantially extending along a first axial direction;
   a second-axis conductive unit substantially extending along a second axial direction and comprising:
      two conductive electrodes respectively located at opposite sides of the first-axis conductive unit; and
      a conductive bridge crossing the first-axis conductive unit and connected to the two conductive electrodes; and
   at least one dummy electrode comprising at least one part located in a gap formed between the first-axis conductive unit and one of the two conductive electrodes, wherein the at least one dummy electrode comprises:
      two main body portions respectively located at opposite sides of the one of the two conductive electrodes; and
      an extending portion in direct contact with the two main body portions, extending into the gap, and disposed under the conductive bridge.

13. The touch sensing layer of claim 12, wherein the extending portion is between the first-axis conductive unit and the one of the two conductive electrodes in the first axial direction.

14. The touch sensing layer of claim 12, wherein the extending portion is between the first-axis conductive unit and the one of the two conductive electrodes in the first axial direction and the second axial direction.

15. A touch sensing layer, comprising:
   a first-axis conductive unit substantially extending along a first axial direction;
   a second-axis conductive unit substantially extending along a second axial direction, wherein the second-axis conductive unit comprises:
      two conductive electrodes respectively located at opposite sides of the first-axis conductive unit; and
      a conductive bridge crossing the first-axis conductive unit and connected to the two conductive electrodes; and
   a first dummy electrode and a second dummy electrode located in a gap formed between the first-axis conductive unit and one of the two conductive electrodes, wherein:
      a longest dimension of the first dummy electrode and a longest dimension of the second dummy electrode extend in a first direction, and
      the first dummy electrode and the second dummy electrode are parallel to each other in the first direction.

16. The touch sensing layer of claim 15, wherein the first direction is different than the first axial direction and different than the second axial direction.

17. The touch sensing layer of claim 15, wherein the first dummy electrode and the second dummy electrode are between the first-axis conductive unit and the one of the two conductive electrodes in the first axial direction and the second axial direction.

18. The touch sensing layer of claim 15, wherein the second dummy electrode is between the first dummy electrode and the one of the two conductive electrodes in the first axial direction.

19. The touch sensing layer of claim 15, wherein the first dummy electrode is strip-shaped.

20. The touch sensing layer of claim 15, comprising an insulating layer between the first-axis conductive unit and the conductive bridge.

* * * * *